Figure 5:
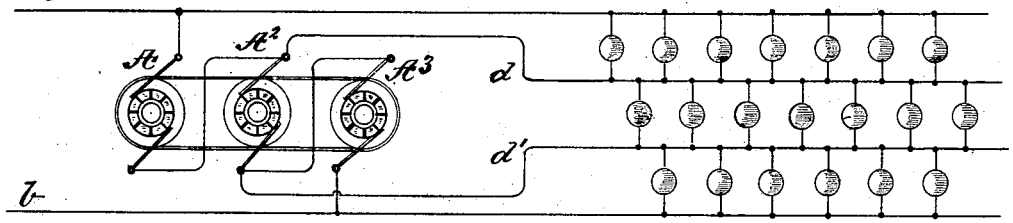

(No Model.) 2 Sheets—Sheet 1.
E. THOMSON.
SYSTEM OF ELECTRIC DISTRIBUTION.
No. 360,125. Patented Mar. 29, 1887.
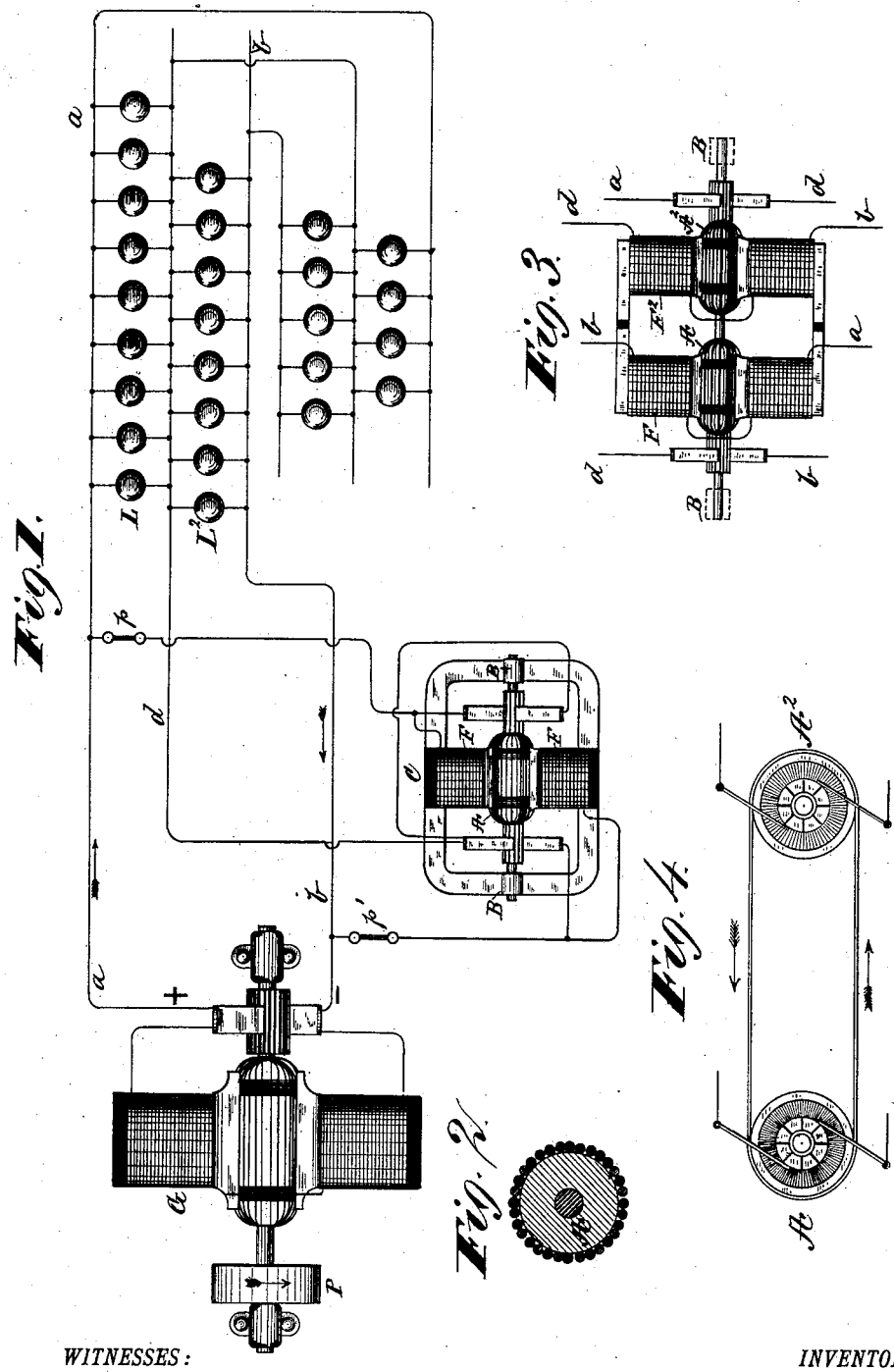
WITNESSES:
INVENTOR
Elihu Thomson.
BY
Townsend & MacArthur
ATTORNEY (No Model.) 2 Sheets—Sheet 2.

E. THOMSON.
SYSTEM OF ELECTRIC DISTRIBUTION.

No. 360,125. Patented Mar. 29, 1887.

WITNESSES:
Gabriel J. W. Galster
Wm H. Capel

INVENTOR
Elihu Thomson
BY
Townsend & MacArthur
ATTORNEYS

N. PETERS, Photo-Lithographer, Washington, D. C.

UNITED STATES PATENT OFFICE.

ELIHU THOMSON, OF LYNN, MASSACHUSETTS.

SYSTEM OF ELECTRIC DISTRIBUTION.

SPECIFICATION forming part of Letters Patent No. 360,125, dated March 29, 1887.

Application filed September 15, 1886. Serial No. 213,632. (No model.)

*To all whom it may concern:*

Be it known that I, ELIHU THOMSON, a citizen of the United States, and a resident of Lynn, in the county of Essex and State of Massachusetts, have invented a certain new and useful System of Electric Distribution, of which the following is a specification.

My present invention relates to means for regulating or determining the distribution of electric energy in cases where it is desired to arrange the electric lamps or other translating devices to be operated by electricity in what is known as "series multiple arc."

The invention is especially applicable to series-multiple-arc systems of incandescent lighting, and I shall hereinafter describe my invention as applied to a system in which incandescent lamps are the translating devices, although, as will be readily understood by those skilled in the art, the invention is likewise applicable to systems in which other translating devices are used. In such cases the current furnished by the dynamo or other source passes to the main and then through a group of lamps to a connecting-wire, from which it passes through another group of lamps to the other or return main and thence to the dynamo, or to other connecting-wires and groups, and finally to the return connecting-main. Such a system would ordinarily require that the energy of current or number of lamps be equal for each multiple-arc group; but where this is not the case a compensation may be secured by the employment of resistances placed in branch circuit around the group or multiple-arc set containing the fewest lamps, or in which the smallest current is needed. In my invention, however, the compensation is rendered automatic, and at the same time a transfer of current energy is made from the parts of the circuit where it would otherwise be in excess to those parts which require more.

Briefly, my invention consists in combining with the mains of a multiple-arc-series system an energy-transferring apparatus or converter, such as will be hereinafter described, by means of which a compensation for a diminished number of lamps in one multiple-arc set is effected by using the excess of current so existing to deliver or produce current for the set or sets of lamps in multiple arc of larger number or demanding more current. I thus am enabled to economically work such a system and permit extinguishment of lamps in any multiple-arc set at will, relying upon my compensating apparatus to effect a proper balance.

My invention will be made clear by reference to the figures.

Figure 6:
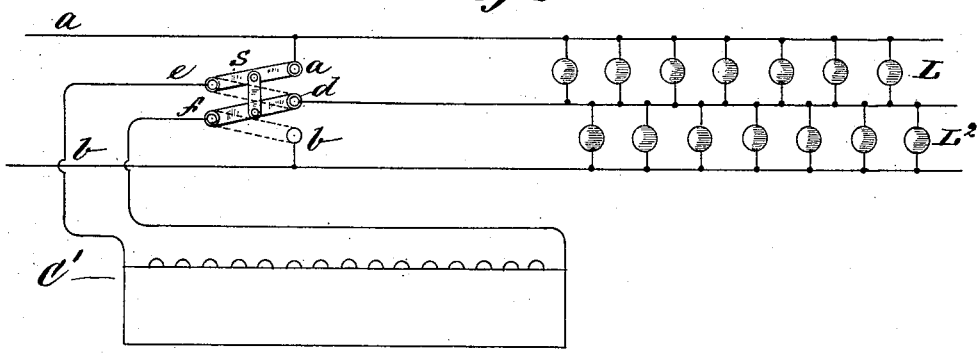
Figure 7:
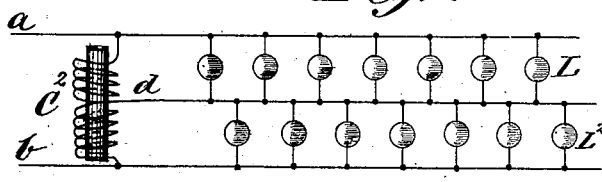
Figure 8:
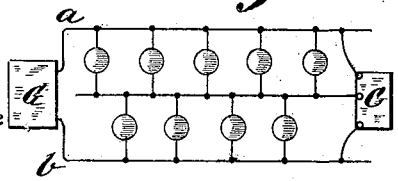
Figure 9:
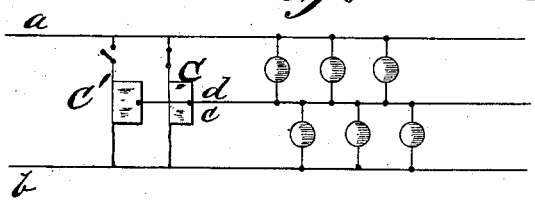
Figure 10:
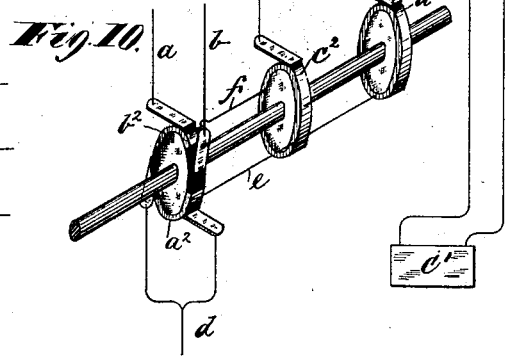

Figure 1 is a diagram typifying a circuit provided with my compensating appliance. Fig. 2 is a detail of part of the compensator or converter shown in Fig. 1. Figs. 3 and 4 illustrate other forms of compensator or converter suitable for use in carrying out my invention. Fig. 5 shows the application of my invention to more extended circuits. Fig. 6 shows an equivalent substitute device. Figs. 7, 8, and 9 show other ways of carrying my invention into effect. Fig. 10 shows a modified form of switch.

In Fig. 1, G represents any generator of electric current suitable for maintaining a fairly constant difference of potential between the mains $a$ and $b$, supplied from said generator as usual. The potential is sufficient to work two multiple-arc sets of lamps in series, as indicated at L L². The intermediate wire, $d$, unites the two sets, or forms a common connection for all those terminals of the lamps not connected to $a$ or $b$.

The groups of lamps L L² are intended to typify any lamps fed in the way shown—that is, the lamps L in parallel to one another, but collectively in series with the lamps L², also in parallel with one another, without regard to where such lamps, singly or collectively, may be placed to give light, whether scattered over a considerable space or in separate buildings or grouped near one another.

The mains $a$ $b$ $d$ may of course be branched and rebranched, as usual in such cases, into numerous smaller sub-mains, with their lamps, provided the electrical relations are undisturbed. Now, in operating such a system, so long as the number of lamps in L and L² be equal, or rather so long as the current demanded by the set L be equal to that demanded by L², no difficulty will be experienced; but should a change take place, as by extinction of a part of the lamps in the set L² by breakage of filaments, or purposely by disconnection from the mains, an excess of current will traverse the remaining lamps of the set, increasing their brilliancy, and tending also to decrease the brilliancy of the lamps in group or set L on account of the increased opposition or resistance to current produced in $L^2$, through the lessened number of paths provided and the consequent cutting down of the current passing. Any attempt to adjust matters by changing the potential at the generator G is without avail. To overcome the difficulty I attach to the mains $a\ b\ d$ what I term a "compensator," "transferring device," or "converter" for current energy. One of the best arrangements is illustrated at C in Fig. 1, properly attached. It consists, as shown, of a sort of dynamo-generator or motor, or rather a combination of the two. The field-magnets F F are either permanent magnets or are otherwise suitably-energized electro-magnets. As shown, they are wound with wire and connected, one terminal to $a$ and the other to $b$, as a shunt to the circuit or branch from $a$ to $b$ of rather high resistance, so as to demand but a very small fraction of the current. The armature A is arranged to revolve, as usual, in front of the field-magnet poles, the shaft being furnished with suitable free-running bearings B B.

The armature may be of any good type, and is wound with a double winding or two separate and insulated sets of coils, which are, however, the counterparts of each other in electro-motive energy.

The armature-windings or sets of coils are each provided with a separate commutator and brushes. (Shown to the right and left of armature A.) The armature-windings are made of quite low resistance and of such length of wire that they will give, respectively, when revolving in the field F F at a high speed, an electromotive force equal to that which normally exists between $a$ and $d$ and between $d$ and $b$—i. e., the voltage of the lamps used in L and $L^2$. The connections are made as shown. Let $a$ be the positive wire of G; then $b$ will be negative, and $d$ nearly neutral, when the lamps in L and $L^2$ are equal in number. A wire is carried from $a$, through a fusible plug, $p$, (preferably,) to one of the brushes of the compensator C, which brush, when the armature A is revolved, will receive a counter electro-motive force from the commutator-segments, tending to oppose the potential of $a$. The opposite brush is connected to $d$. On the other side, as shown, and at the other commutator, a brush is connected to $b$ in like manner, so that when revolved the armature A will give a counter force to oppose the potential of $b$. The opposite (upper) brush is connected to $d$. The apparatus and circuits thus arranged will give the following results: Assuming the demand for current in L and $L^2$ the same, the potential between $a$ and $d$ will be equal to that existing between $d$ and $b$. The armature A will receive current at both commutators, tending to short-circuit from $a$ to $d$ and from $d$ to $b$ through each set of coils on it. These windings may be of the Siemens or Gramme order, with suitable commutators. The result of current passing in A, if the brushes on the commutator be set on the neutral line, will be to drive A as a motor without load, and its speed of rotation will continually increase until the counter potentials developed in its coils almost neutralize the potentials between $a$ and $d$ and $d$ and $b$, so that little current flows in A, and only enough to keep up the speed of A. Now let some of the lamps L be cut off. The potential between $a$ and $d$ will at once rise and that between $d$ and $b$ will fall, because the resistances are now no longer evenly distributed from $a$ to $b$. As the resistances of the windings on A are quite low, more current will now pass from $a$ to $d$ through one winding of the compensator-armature A, and it will run faster than before. The device will now act as a generator to give current back to the circuit between $d$ and $b$ by the other winding; or, in other words, it becomes a motor-generator running by the higher potential to feed the main having the lower, and the action will occur with either winding on A, according as the higher potential exists between $a$ and $d$ or between $d$ and $b$, the higher potential sending current through the motor-generator C and inducing current in the other armature-winding, which is fed out to raise the lower potential. It is essential that the resistances of the windings on A be so low as to be negligable, and that their opposition to passage of current under normal conditions be due to counter electro-motive force solely.

As will be seen under the conditions set forth, the apparatus acts as a converter for turning or converting the electric energy or potential existing between one pair of mains into electric energy or potential between another pair, so as to effect an equalization.

As it is usually only necessary to provide for a partial extinction of lamps in either group, the compensator C is small compared to the generator G, and, furthermore, its effectiveness can be enhanced by constructing it to run at very high speeds, as it requires no belts and there is no strain on its bearings.

One of the best ways of winding the armature A is to wind the two systems of wires alongside of one another, as indicated in Fig. 2, where one is shown black and the other white. However, other forms of motor-generator or double-wound armatures may be used.

In Fig. 3 an obvious equivalent of the double-wound armature of Fig. 1 is illustrated. In this instance the two sets of motor-armature windings are disposed upon separate cores or carriers connected by being secured to a common shaft, with the result, as before, that an increase of current in either armature-winding will cause the shaft to revolve faster and make the other armature-winding act as the coils of a generator delivering current to the other pair of mains.

The armatures A and $A^2$ are perfectly matched and revolved either in the same field or matched fields, acting virtually as the double-wound armature A, Fig. 1, the connections to the commutator and brushes being identical and indicated by the letters $d\ b\ a\ d$, Fig. 3, standing for the mains, Fig. 1, to which the wires so marked are to be connected.

Where the field-magnets are separate matched magnets and coils, they are preferably connected to the circuits in the manner indicated by the letters applied to the magnet-terminals—that is to say, the terminals $b$ and $a$ of field-magnet F are connected, respectively, to the similarly-lettered mains, Fig. 1, while the terminals $d\ b$ of field-magnet $F^2$ are connected, respectively, to the similarly-lettered mains, Fig. 1.

It will be noticed that the armatures and fields thus exchange their relative connections, which gives increased sensitiveness of compensation. The compensating-armatures may, instead of running on the same shaft, be run on separate shafts and geared or belted together, as indicated in Fig. 4; but such a disposition involves loss by undue friction.

In Fig. 5 is represented a system in which three groups or sets of lamps are in series between $a$ and $b$, with two intermediate wires or mains, $d\ d'$. In this case there will be three windings on the armature of the compensator, or it will have three armatures, A $A^2\ A^3$, running together, as indicated in the figure. The connections to the commutator-brushes of one winding or armature will be from $a$ to $d$, of the next from $d$ to $d'$, and of the third from $d'$ to $b$. The principles of operation are the same as in Fig. 1, but a little more complex, as will be readily understood by any electrician.

Fig. 6 shows how a secondary battery, C', may be used as a compensator or converter for transferring or converting the surplus of electric energy in one part of the system into electric energy in another part. The battery may be of very low internal resistance, but of small capacity for storage, such as a battery composed of large surface of simple lead plates would make. The cells must be sufficient in number to equal in electro-motive force the potential existing between $a$ and $d$ or $d$ and $b$, when the lamps L are equal in number or in energy absorbed to $L^2$. The terminals of the battery $e\ f$ are connected to a shifting-switch, which alternately connects $e\ f$ to $a\ d$, respectively, and $e\ f$ to $d\ b$, respectively. The wires $a\ b$ lead to the generating source, as in Fig. 1. Rapid movements are given to the transfer-switch S by any suitable means. Now, should the potential between $a\ d$ exceed that between $d\ b$, as a consequence of more lights being operated between $d$ and $b$ than between $a$ and $d$, the battery C' will receive current when in connection with $a\ d$, which current will produce the ordinary chemical reactions, followed, when the battery is connected to $d\ b$, by the chemical recompositions resulting in the development of electric current, which is delivered to $d\ b$ by virtue of the existing difference of potential. In this case, as before, the excess of energy on one set of wires is, by means of the battery and the chemical reactions taking place in the same, converted into energy on another set, just as, in the embodiment of the invention before described, the excess of energy on one set is, through its action as a mechanical power and the reconversion of such power by the magnet's electric action on the other set of coils, finally converted into electrical energy in the other set of connections leading to another pair of mains.

A rotary switch driven by power may replace the oscillation S, and give the same results of alternate connections of $e$ and $f$ to $a$ and $d$ and to $d$ and $b$, respectively. Such a form of switch is typified in Fig. 10. $a^2\ b^2$ indicate segments of a circular commutator, upon which bear the four brushes, connected as indicated by the letters corresponding to the mains. The segments themselves are connected to the poles of the battery through conducting-rings $c^2\ d^2$, which are mounted upon and revolve with the commutator, and are kept in constant connection with the battery by brushes bearing upon the rings. The structure indicated is similar to one sometimes employed in dynamo-machines, and the result of revolving the commutator is obviously the same as would be produced by rapidly working the switch S, Fig. 6.

In cases where alternating currents are fed to the mains $a\ b$ the compensator or converter may best be of the kind illustrated in Fig. 7 at $C^2$, indicating any good type of induction-coil, the primary and secondary coils of which are alike in all respects and situated at relatively equal distances from the core of iron wire. One coil is attached between $a$ and $d$ and the other between $d$ and $b$, and the direction of the two windings is such that the connection to $d$ may be considered as a connection to the middle of a single coil, made up of the two coils as halves, wound and connected from $a$ to $b$ without change of direction. In this case it is obvious that the conversion or transfer takes place by direct electro-magnetic and magneto-electric actions, without the intervention of the mechanical power which is employed in Fig. 1, as a link in the chain of conversion.

The compensator or converter C, Fig. 8, is shown as placed at the end of the main conductors distant from the generator G; but it is preferred to place it near the generator for convenience.

In Fig. 9 two compensator devices, C and C', are shown, C being kept in circuit, while C' may be ready to connect in case the capacity for compensation of C be limited and there is a demand for further transfer.

Of course it will be understood that any indicator of potential differences may be used as a detector of differences of load in the sets or groups—such as ordinary voltmeters and the like—connected from $a$ to $d$ and from $d$ to

*b*; but with the devices described it is ordinarily unnecessary to watch the operation, as the transfer of energy is quite automatic during the compensation.

What I claim as my invention is—

1. In combination with a multiple-series system, an intermediate conductor between the groups or sets of translating devices, and a compensating or energy-transferring device, substantially such as described, whereby energy is abstracted from that portion of the system having a potential difference above the normal and is converted into energy on that portion of the system having a potential below the normal.

2. The combination, with the mains and an intermediate conductor of a multiple-arc-series system, of connections from each main and to said intermediate conductor, a counter-electro-motive-force generator adjusted to develop a counter electro-motive force equal to the normal difference of potential between a main conductor and the intermediate conductor, and means whereby the energy absorbed by said generator from a main having a greater potential may be reconverted into energy on the main or conductor having a less potential.

3. A compensator or energy-transferring device for multiple-arc-series systems, consisting of two armature-coils, systems, and commutators for the same mounted so as to move together in relation to the magnetic field of the field-magnets, one of said systems being connected through its commutator-brushes with a main conductor and the intermediate conductor, while the other system is connected through its commutator-brushes with the other main conductor and the intermediate conductor, substantially as described.

Signed at Lynn, in the county of Essex and State of Massachusetts, this 7th day of September, A. D. 1886.

ELIHU THOMSON.

Witnesses.
  J. W. GIBBONEY,
  E. WILBUR RICE, Jr.